United States Patent
Hellemans

(10) Patent No.: US 8,878,716 B2
(45) Date of Patent: Nov. 4, 2014

(54) CODE SET DETERMINATION FOR A REMOTE CONTROL

(75) Inventor: Lucas Griet Johan Hellemans, Haasrode (BE)

(73) Assignee: Koninklijke Philips N.V., Eindhoven (NL)

(*) Notice: Subject to any disclaimer, the term of this patent is extended or adjusted under 35 U.S.C. 154(b) by 422 days.

(21) Appl. No.: 13/202,114

(22) PCT Filed: Feb. 19, 2010

(86) PCT No.: PCT/IB2010/050749
§ 371 (c)(1),
(2), (4) Date: Aug. 18, 2011

(87) PCT Pub. No.: WO2010/097744
PCT Pub. Date: Sep. 2, 2010

(65) Prior Publication Data
US 2011/0298646 A1    Dec. 8, 2011

(30) Foreign Application Priority Data

Feb. 24, 2009 (EP) .................................. 09153521

(51) Int. Cl.
G08C 19/12 (2006.01)
H04N 5/44 (2011.01)
H04N 21/422 (2011.01)

(52) U.S. Cl.
CPC ....... H04N 5/4403 (2013.01); H04N 21/42225 (2013.01); H04N 2005/4435 (2013.01); H04N 2005/4444 (2013.01)
USPC ........................................................ 341/176

(58) Field of Classification Search
None
See application file for complete search history.

(56) References Cited

U.S. PATENT DOCUMENTS

| | | | |
|---|---|---|---|
| 3,944,982 A * | 3/1976 | Mogi et al. .................... 367/197 |
| 5,455,570 A * | 10/1995 | Cook et al. .................... 340/3.71 |
| 6,747,568 B1 * | 6/2004 | Teskey ........................ 340/12.28 |
| 7,006,881 B1 | 2/2006 | Hoffberg et al. |
| 7,161,466 B2 | 1/2007 | Chuey |
| 2006/0161690 A1 | 7/2006 | Kavanagh et al. |
| 2007/0052547 A1 | 3/2007 | Haughawout et al. |
| 2009/0237287 A1 * | 9/2009 | D'Hoore et al. .............. 341/176 |
| 2009/0244403 A1 * | 10/2009 | Beals ........................... 348/734 |

FOREIGN PATENT DOCUMENTS

| | | |
|---|---|---|
| WO | 2005077083 A2 | 8/2005 |
| WO | 2007105142 A1 | 9/2007 |
| WO | 2008009142 A1 | 1/2008 |

* cited by examiner

Primary Examiner — Brian Zimmerman
Assistant Examiner — Kevin Lau

(57) ABSTRACT

A method for determining the right code set to be used for controlling an appliance includes the remote control sends one or more commands using the corresponding code of at least one of the multiple code sets to the appliance. The code set to be used for controlling this appliance is determined based on at least a command sent to the appliance by a user of the remote control, in reaction to the sending of the one or more commands by the remote control.

18 Claims, 2 Drawing Sheets

CODE SET DETERMINATION FOR A REMOTE CONTROL

FIELD OF THE INVENTION

The invention relates to a method for determining a code set to be used out of multiple code sets in a remote control for controlling an appliance.

The invention further relates to a remote control for controlling an appliance by using one of multiple code sets.

The invention also relates to a computer program for enabling a programmable device to perform a method for determining a code set to be used.

BACKGROUND OF THE INVENTION

Universal Remote Controls (URCs) are designed for controlling a large amount of appliances. Each of these appliances needs to be controlled by using codes of its own code set corresponding to a certain Infra Red (IR) protocol. There are basically two known solutions for dealing with this issue.

According to the first known solution, when the user selects a certain command (i.e. a function, such as power on/off, volume up/down, etc.) on the remote control, the codes corresponding to this command from a predefined subset of all code sets of the URC (the most common code sets) are sequentially sent. The main disadvantage of sending codes sequentially is that a user has to wait until all codes are sent, before he can issue a new command. Another drawback is that so called repetition features of the applicable IR protocol cannot be used. As a result, the appliance will react noticeably slower to some commands than when it is used with its original (proprietary) remote control. In case of audiovisual appliances, an example of such a command resulting in a slow reaction is "Volume up/down". This command is typically used by keeping the volume key pressed, until the volume reaches the level that the user wants. Furthermore, by sending all codes corresponding to a command sequentially, more codes are sent than needed wasting batterylife.

According to the second known solution, the user has to configure the Universal Remote Control (URC) to work with a certain appliance by selecting the corresponding code set in a special set up mode. WO 2007/105142 discloses several methods for this purpose. However, these methods need user-input of an identifier of a code set or a brand and/or a user confirmation if the selected code set works properly with the appliance. Thereto, the user must follow certain user instructions. Such instructions may be provided to the user by means of the user manual or on the display of the remote control. Some user groups, for example young children or elderly people are not able to carry out such instructions and for the remaining user groups it is a burden.

SUMMARY OF THE INVENTION

It would be advantageous to enable the determination of a code set to be used out of multiple code sets in a remote control in a more user-friendly way.

To better address this concern, in a first aspect of the invention a method is provided for determining a code set to be used out of multiple code sets in a remote control for controlling an appliance comprising the steps of sending at least a command using the corresponding code of at least one of the multiple code sets and determining the code set to be used based on at least a command sent by a user of the remote control, in reaction thereto.

As a result, the user does not need to comply with instructions in a special set-up mode to select the right code set. Instead, he only has to give a natural reaction to the one or more commands that the remote control sends to the appliance during normal operation. By selecting the right code set and using it for sending the user commands, power saving is achieved with respect to the prior art solution of sequentially sending a plurality of codes corresponding to a command.

According to an embodiment, the remote control during normal operation automatically sends a fake command (i.e. a command autonomously generated by the remote control and not based on a user action) using the corresponding codes from a subset of the multiple code sets. In case that the fake command is sent using a code from a code set not corresponding to the appliance, the state of the appliance will not change. In this case, the user will not react and it can be determined that the controlled appliance uses a different protocol than the one(s) used for sending the fake command. However, in case that (one of) the sent code(s) corresponds to the code set used by the appliance, its state will change, accordingly. Generally, the user will undo this fake command by selecting an appropriate command on the remote control within a certain time limit. In case that the user, in reaction to the fake command, sends such a command undoing the fake command, it is determined that the appliance probably uses the code set, from which (one of) the code (s) was taken to send the fake command.

Preferably, the fake command is intermittently sent, each time by using a code from a single code set. The used code set is varied over time until all of them have been tried. In this way, the used code set can be determined with a high probability in a reasonable time.

According to a further embodiment, a command selected by the user is sent to the appliance using the corresponding codes from a subset of the multiple code sets. In case that the command is sent using codes from a subset of code sets not corresponding to the appliance, the state of the appliance does not change. It is then likely that the user repeats the same command within a time interval. So, such a repeated sending of the same command can be taken as a strong indication that the appliance does not use any of the code sets from the subset. On the other hand, if the user does not repeat the same command within a certain time interval, this is probably because the state of the appliance has changed as expected by the user. So, in this case it is likely that the appliance uses one of the code sets from the subset. Repeating this procedure a few times with different subsets of code sets will ultimately lead to the code set to be used for controlling the appliance.

According to a still further embodiment, a command selected by a user is sent using the corresponding code of at least one of the multiple code sets a different number of times than the corresponding code of at least another one of the multiple code sets. Preferably, the command is taken out of the group of commands having an opposite command, the use of the opposite command resulting in an opposite effect at the appliance to the effect caused by the command. The code set to be used may then be determined based on the proportion of the number of times that the command and the opposite command are selected by the user during a time interval. For example, in case that the appliance works with a code set of which the command is sent by repeating the corresponding code several times (i.e. a plurality of frames is sent) and the opposite command is sent by sending the corresponding code only once (i.e. a single frame is sent), over some time the user will use the command considerably less than its opposite command. So, in case that the proportion between these two commands is low, it is likely that the appliance works with this code set. In case that it is likely that a certain code set is used, it is possible to perform further tests by changing the number of times that the code of this code set is used to send the command. In case that it is unlikely that a certain code set is used, the procedure may be repeated for another one of the plurality of code sets.

The different embodiments described herein above may be applied alone or in combination.

Preferably, the method according to the invention is implemented by means of a computer program.

The computer program may be embodied on a computer readable medium or a carrier medium may carry the computer program. According to a further aspect of the invention a remote control is provided adapted for controlling an appliance by using one of multiple code sets, the remote control comprising:

a transmitter for sending at least one command using the corresponding code of at least one of the multiple code sets; and a processor for determining the code set to be used based on commands sent by a user of the remote control, in reaction to the sending of the at least one command.

These and other aspects of the invention will be apparent from and elucidated with reference to the embodiments described hereinafter.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF THE PRESENT INVENTION

Figures 1, 2:
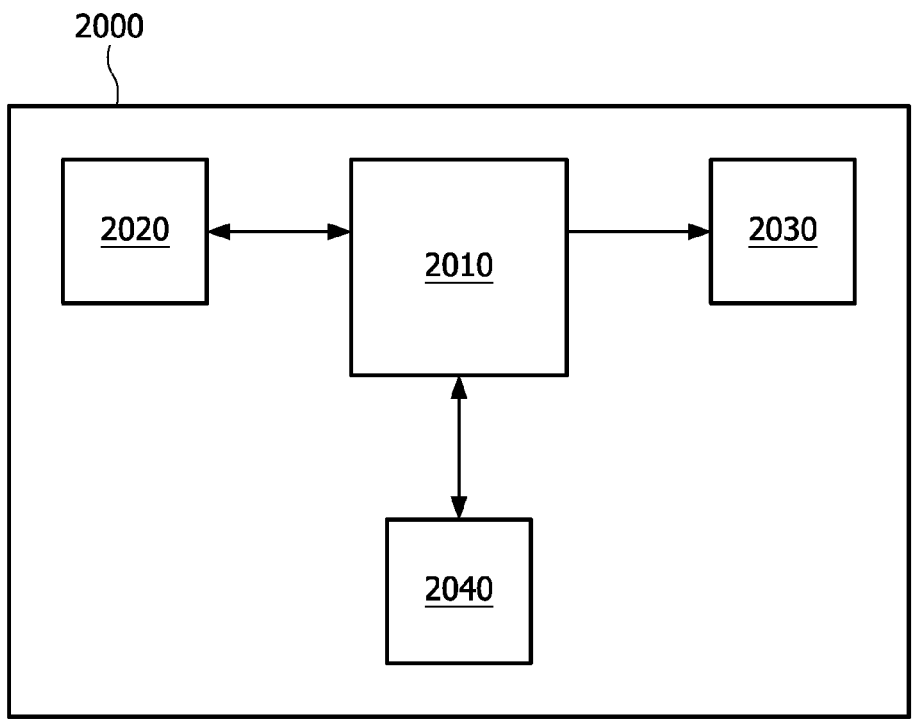
FIG. 1 schematically shows an exemplary relationship between the commands of a remote control and a plurality of code sets.
FIG. 2 shows a block diagram of a remote control wherein the present invention may be implemented.

Referring to FIG. 1, an exemplary relationship between the commands of a Universal Remote Control (URC) and a plurality of code sets will be explained. In this description, a command is to be understood as a function of the remote control for controlling an appliance. Generally, a command is generated by pressing the corresponding key on the remote control but also other ways of generating a command are possible, for example by touching a certain area of a touch screen, in case that the remote control is equipped with such a touch screen. Examples of remote control commands are: volume up, volume down, power on/off, channel up/down, etc. As a result of the generated command, the corresponding Infrared (IR) code is sent to the appliance.

URCs can be used for controlling any one of a large plurality of appliances. However, appliances generally work with only a single code set (IR protocol). So, the URC must select the right code set to be used for controlling the appliance.

FIG. 1 schematically shows the relationship between the set of commands 100 of a remote control and a plurality of code sets (IR protocols) 200, 300, ... 900. The set of commands 100 consists of a plurality of commands 101,102, ... 199. For each of the commands 101,102, ... 199 a corresponding code 201,202, ... 299,301,302, ... 399,901,902, ... 999 is defined in the code sets 200,300, ... 900. Generally, the codes of different code sets corresponding to a certain command will be different but it is also possible that some of the code sets, partially "overlap", i.e. that their codes corresponding to a certain command are the same.

FIG. 2 shows a block diagram of a URC 2000 suitable for implementing the present invention. Only the relevant components are shown. The URC 2000 comprises a processor 2010, a keyboard 2020, an IR transmitter 2030 for transmitting control codes and a memory 2040. The invention is preferably implemented by a suitable computer program stored in memory 2040, which is run by processor 2010, as will be described in more detail herein after. The plurality of code sets 200,300, ... 900 and their relationship to the set of commands 100 of the URC are also stored in the memory 2040.

Figure 3:
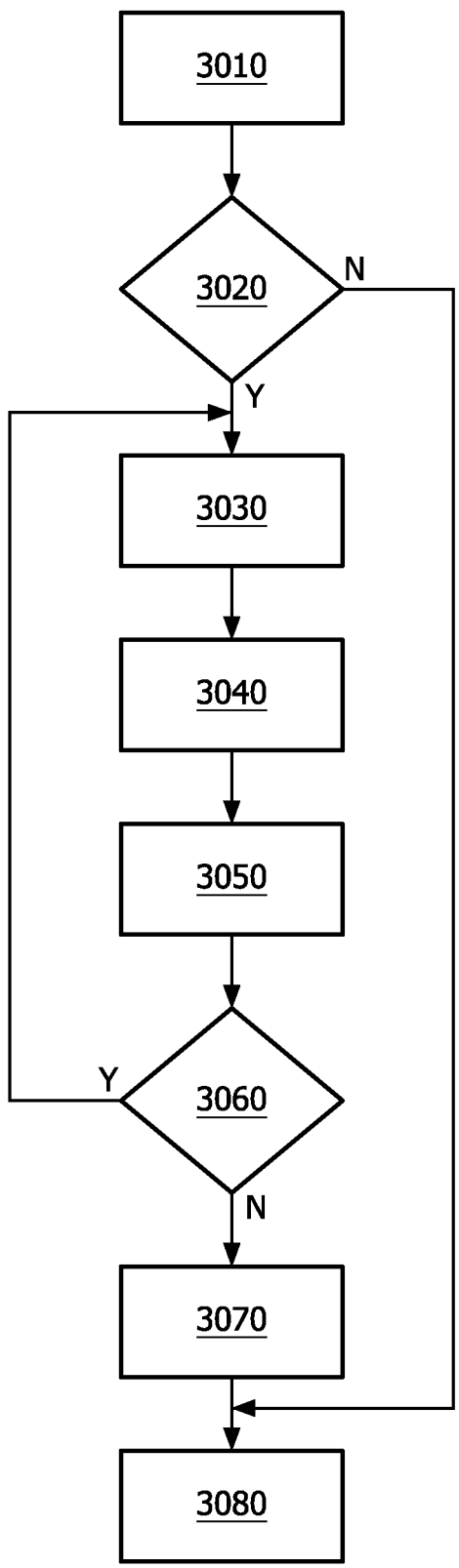
FIG. 3 shows a flow chart according to an exemplary embodiment of the invention of the steps to select a code set to be used for controlling an appliance. Throughout the Figures like reference numerals refer to like elements.

Referring to FIG. 3, a method according to an embodiment of the present invention will now be described for selecting the right code set to be used with a certain appliance, when the URC is in normal operation (i.e. not in set-up mode). After START 3010, it is determined if more than one code set is installed in the URC 3020. If this is not the case, the method jumps to END 3080. If there is more than one code set installed, the sequence of commands to be sent is determined 3030. Subsequently, it is determined which codes are to be used for sending each of the commands determined in the previous step, i.e. it is determined from which of the code sets, the codes corresponding to a certain command are to be transmitted 3040. Furthermore, the IR transmitter 2030 is controlled to send these codes to the appliance. If codes from the right code set are sent to the appliance, the appliance will change its state. Otherwise the state of the appliance will most likely not change. Thereafter, the commands, which the user sends to the appliance in reaction to the transmitted commands, are analyzed 3050. It is then determined if further tests are needed to determine the right code set for the appliance 3060. If this is the case the method loops back to step 3030. If this is not the case, the code set to be used is determined 3070 and the method is ended 3080.

According to an embodiment, the remote control during normal operation automatically and intermittently sends a fake command (i.e. a command autonomously generated by the remote control and not based on a user action) in step 3040 by using the corresponding code from one of the code sets loaded to the memory 2040 of the URC 2000. A very suitable fake command is the mute command. If there is no reaction from the user, as determined in step 3050, the appliance to be controlled probably uses a different code set. If the user generate an un-mute command or a volume command within a certain time interval (for example a few seconds), it is very likely that the appliance to be controlled uses the code set. The code set from which the code is taken is varied until all have been tried. This test may be repeated a few times in order to avoid the selection of an erroneous code set.

According to a further embodiment of the present invention, when a user during normal operation selects a command, the corresponding codes of only a subset of all code sets stored in the memory 2040 are sequentially transmitted (step 3040). For example, in case that the user presses "power off" for controlling a TV-set, only the corresponding codes from the code sets of only a subset of all manufacturers are sent. If the user presses "power off" again within a few seconds, it is likely that his TV-set is not of any of these manufacturers.

Repeating this test a number of times with different subsets, will ultimately lead to the determination of the right code set (step 3070).

According to a still further embodiment, during normal operation a command selected by a user is sent using the corresponding code of at least one of the multiple code sets a different number of times than the corresponding code of at least another one of the multiple code sets. The command may be taken out of the group of commands having an opposite command. The code set to be used may then be determined based on the proportion of the number of times that the command and the opposite command are selected by the user during a time interval. An example hereof is asymmetric volume control. For example, for the command "volume up" the corresponding code of a TV-set of a first manufacturer is sent twice (in other words, two frames with the code corresponding to the "volume up" command are sent) and the corresponding code for TV-sets of all other manufacturers is sent once. For the opposite command "volume down" the corresponding code of a TV-set of a second manufacturer is sent twice and the corresponding code for TV-sets of all other manufacturers is sent once. After tracking the commands generated by the user for some time, the proportion of the number of times that "volume up" and "volume down" are pressed is checked (step 3050). If the user presses "volume down" two times more than "volume up", he is probably using the TV-set of the first manufacturer. If the user presses "volume up" two times more than "volume down", he is probably using the TV-set of the second manufacturer. If he presses "volume up" and "volume down" roughly the same amount of times, he is probably using a TV-set of neither the first nor the second manufacturer. If it is likely that a TV-set of either the first or the second manufacturer is used, it may be determined that extra tests have to be performed (step 3060), for example by sending three codes per command in one direction and one code per command in the other direction. If it is likely that a TV-set of neither the first nor the second manufacturer is used, the test can be repeated by sending two codes per "volume up" command for a third manufacturer and two codes per "volume down" command for a fourth manufacturer.

The different embodiments described herein above may be applied alone or in combination.

It would be advantageous to use metadata of the code sets in order to determine the right code set. For example, for a Samsung® TV-set, the user needs to press the command "-/--" to enter double digit numbers, for a Philips® TV-set that is not needed. Philips® TV sets switch on when the power button is pressed, LG® TV sets do not. On a Philips® TV-set one has to press cursor left to go back in the menu, on a Samsung® TV-set the user has to press back for the same purpose. Adding this information to the search helps to speed up the determination of the right code set.

Furthermore, it would be advantageous to have a mechanism to go back to a previous phase in case that the algorithm discards a code set, erroneously. For example, take the case that processor starts the algorithm using asymmetric volume control, explained herein above, with a plurality of code sets, wherein each of the code sets belongs to a different manufacturer. As explained herein above, based on test results the algorithm may determine that certain code sets are not correct. These sets are then taken out of the group of code sets to be tested and further tests based on this reduced group of code sets are performed. However, if one of the discarded code sets is the correct code set (i.e. it was discarded by mistake), it appears to the user that the remote is no longer working and the most common reaction of the user in this situation is to take out the batteries and put them back in. So if the user takes out the batteries, for example, the last two discarded codesets may be "readmitted" to the testing algorithm and all other code sets may be discarded.

Additionally, user profiles may be used to optimize the algorithm for determining the right code set. For example, it may be determined from the commands that are selected by the user, if he is a "zapper", i.e. he uses only channel up/down to change channels or a "non-zapper", i.e. he uses the digit buttons on his remote control for channel selection. A further example hereof is to check whether the user uses the mute button or uses the volume down button to mute. Such information may be used to speed up the search for the right code set. For example, if the user normally uses the mute button to mute, the algorithm using asymmetric volume control described herein above, would probably not work and it is more efficient to use an algorithm for determining the right code set, which uses different commands.

Based on the user behavior during normal operation as described so far, conclusions may be drawn that are useful if the user subsequently selects a set-up mode for selecting the code set to be used in a manner known per se.

For example, if the user starts using the remote control for the first time and only tries a limited amount of codes during normal operation before selecting the setup procedure, it can be assumed that his appliance did not react to any of the codes that were sent during normal operation. In the setup procedure, these codes could be placed at the end of the search algorithm, thus increasing the probability that the right code set will be found fast.

If the user works with the remote a few hours or days in the normal mode before entering the setup mode, it can be assumed that he is using a suitable code set for his appliance and that only the codes corresponding to one or more specific commands ("buttons") are missing. In the setup mode, the user can be guided to the codes corresponding to these buttons. This is further illustrated with an example. Generally, for Philips® TV sets standard codes are used for red, green, yellow and blue. However, for some Philips® TV-sets red, green, yellow and blue are multiplexed with other functions, such as smart picture or smart sound. As a result, there are two different codesets for Philips® TV sets, one with the IR code for red on the red button and one with the Ircode for smart sound on the red button. As a result, it may occur that all commands work fine, except the red, green, yellow and blue buttons. In this case it is not needed to go through the full setup starting from the start, but the processor can leverage on what is already known from the users behaviour. In short, information is captured in order to find the right codeset in a selected subset of code sets (in this example, the subset of code sets for Philips® TV sets). If the right codeset is not found in the subset, the captured information can still be used to find the right codeset in the complete set of available code sets.

While the invention has been illustrated and described in detail in the drawings and foregoing description, such illustration and description are to be considered illustrative or exemplary and not restrictive; the invention is not limited to the disclosed embodiments.

For example, the invention can be applied to remote controls using Radio Frequency (RF) transmission instead of IR transmission. Furthermore, the specific commands that can be used for implementing the invention are only exemplary; the invention can be implemented by using other commands.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for determining a code set to be used out of multiple code sets in a remote control having a set-up mode for controlling an appliance during a normal operation mode comprising the acts of:

sending commands by a user via the remote control in the normal operation mode using code sets of the remote control for controlling the appliance;

placing the used code sets at end of a list of the multiple code sets when the appliance does not respond to the commands and it is detected that the user starts using the remote control for a first time and only tries a limited amount of codes including the used code sets during the normal operation mode before selecting the setup mode;

sending a next command from the remote control during the normal operation mode using a next code set from the list; analyzing reaction of the user to the sending act of the next command;

repeating sending further next commands and analyzing user reactions until determination that the appliance responds using the code set; and determining the code set to be used for controlling the appliance based on the analyzing act.

2. The method according to claim 1, wherein the act of sending the next command comprises the remote control automatically sending a fake command using corresponding codes from a subset of the multiple code sets.

3. The method according to claim 2, wherein the fake command is sent intermittently using the corresponding code of a varying one of the multiple code sets.

4. The method according to claim 1, wherein the act of sending the next command comprises sending a command selected by the user using the corresponding code of at least one of the multiple code sets a different number of times than a corresponding code of at least another one of the multiple code sets.

5. The method according to claim 4, wherein the next command is taken out of a group of commands having an opposite command, the use of the opposite command resulting in an opposite effect at the appliance to the effect caused by the next command.

6. A method for determining a code set to be used out of multiple code sets in a remote control for controlling an appliance comprising the acts of:

sending a first command from the remote control using a corresponding code of at least one of the multiple code sets; and determining the code set to be used for controlling the appliance based on a user command sent by a user of the remote control in reaction to the sending act, wherein the first command is taken out of a group of commands having an opposite command for causing an opposite effect at the appliance to the effect caused by the first command, wherein the sending act comprises sending the code corresponding to the first command of at least one of the multiple code sets a different number of times than a corresponding code of at least another one of the multiple code sets in response to selection by the user of the first command, and wherein the code set to be used is determined based on a proportion of the number of times that the first command and the opposite command are selected by the user during a time interval.

7. A non-transitory computer readable medium comprising computer instructions which, when executed by a processor, configure the processor to perform a method for determining a code set to be used out of multiple code sets in a remote control having a set-up mode for controlling an appliance during a normal operation mode comprising the acts of:

sending commands by a user via the remote control in the normal operation mode with code sets of the remote control for controlling the appliance;

placing the used code sets at end of a list of the multiple code sets when the appliance does not respond to the commands and it is detected that the user starts using the remote control for a first time and only tries a limited amount of codes including the used code sets during the normal operation mode before selecting the setup mode;

sending a next command from the remote control during the normal operation mode using a next code set from the list; analyzing reaction of the user to the sending act of the next command;

repeating sending further next commands and analyzing user reactions until determination that the appliance responds using the code set; and determining the code set to be used for controlling the appliance based on the analyzing act.

8. A remote control having a set-up mode and adapted for controlling an appliance during a normal operation mode by using one of multiple code sets, the remote control comprising:

a transmitter for sending commands by a user via the remote control in the normal operation mode with code sets of the remote control for controlling the appliance;

a processor for performing the acts of:

placing the used code sets at end of a list of the multiple code sets when the appliance does not respond to the commands and it is detected that the user starts using the remote control for a first time and only tries a limited amount of codes including the used code sets during the normal operation mode before selecting the setup mode;

sending a next command from the remote control during the normal operation mode using a corresponding code from the list;

analyzing reaction of the user to the sending act of the next command;

repeating sending further next commends and analyzing user reactions until determination that the appliance responds using the code set; and determining the code set to be used for controlling the appliance based on the analyzing act.

9. The remote control according to claim 8, wherein the first command is sent by act of sending the next command comprises automatically sending a fake command using the corresponding codes from a subset of the multiple code sets.

10. The remote control according to claim 8, wherein the act of sending the next command comprises sending a command selected by a user using the corresponding code of at least one of the multiple code sets a different number of times than a corresponding code of at least another one of the multiple code sets.

11. The method according to claim 1, wherein the determining act includes using a metadata of the code sets indicating which commands are needed or not needed for specific appliances.

12. The method according to claim 1, further comprising the acts of:
discarding code sets the remote control that do not allow control of the appliance by the remote control;
detecting whether a user takes out a batteries of the remote control; and
readmitting at least one of a most recent of the discarded code sets upon detection that the batteries have been taken out.

13. The method according to claim 12, further comprising the act of excluding all other code sets upon detection that the batteries have been taken out.

14. The method according to claim 1, further comprising the act of determining a user profile of a user of the remote control, wherein the act of determining the code set to be used for controlling the appliance is dependent on the user profile.

15. A remote control adapted for controlling an appliance by using one of multiple code sets, the remote control comprising:
a transmitter configured to send a first command using the corresponding code of at least one of the multiple code sets; and
a processor configured to determine the code set to be used for controlling the appliance based on a user command sent by a user of the remote control in reaction to the sending of the first command by the transmitter and to place used code sets at end of the list for determining the code set to be used when it is detected that the user starts using the remote control for a first time and only tries a limited amount of codes including the used code sets during normal operation before selecting a setup procedure,
wherein the first command is taken out of a group of commands having an opposite command for causing an opposite effect at the appliance to the effect caused by the first command,
wherein the transmitter is further configured to send the code corresponding to the first command of at least one of the multiple code sets a different number of times than a corresponding code of at least another one of the multiple code sets in response to selection by the user of the first command,
wherein the code set to be used is determined based on a proportion of the number of times that the first command and the opposite command are selected by the user during a time interval.

16. The method of claim 1, wherein the determining act determines the code set to be used for controlling the appliance based on whether a second command subsequent to a first command repeats the first command within a time interval.

17. The non-transitory computer readable medium of claim 7, wherein the determining act determines the code set to be used for controlling the appliance based on whether a second command subsequent to a first command repeats the first command within a time interval.

18. The remote control of claim 8, wherein the determining act determines the code set to be used for controlling the appliance based on whether a second command subsequent to a first command repeats the first command within a time interval.

* * * * *